US011210021B2

(12) United States Patent
Onodera

(10) Patent No.: US 11,210,021 B2
(45) Date of Patent: Dec. 28, 2021

(54) STORAGE DEVICE AND METHOD OF CONTROLLING STORAGE DEVICE

(71) Applicant: Toshiba Memory Corporation, Tokyo (JP)

(72) Inventor: Takuya Onodera, Kamakura Kanagawa (JP)

(73) Assignee: TOSHIBA MEMORY CORPORATION, Tokyo (JP)

( * ) Notice: Subject to any disclaimer, the term of this patent is extended or adjusted under 35 U.S.C. 154(b) by 167 days.

(21) Appl. No.: 16/553,390

(22) Filed: Aug. 28, 2019

(65) Prior Publication Data
US 2020/0285417 A1    Sep. 10, 2020

(30) Foreign Application Priority Data

Mar. 7, 2019  (JP) .............................. JP2019-041739

(51) Int. Cl.
*G06F 3/06* (2006.01)
*G06F 12/1009* (2016.01)
*G06F 13/16* (2006.01)

(52) U.S. Cl.
CPC .......... *G06F 3/0659* (2013.01); *G06F 3/0604* (2013.01); *G06F 3/0679* (2013.01); *G06F 12/1009* (2013.01); *G06F 13/1668* (2013.01); *G06F 2212/657* (2013.01)

(58) Field of Classification Search
USPC ....................................................... 711/103
See application file for complete search history.

(56) References Cited

U.S. PATENT DOCUMENTS

| 8,250,245 | B2 * | 8/2012 | Tanaka ................... | G06F 3/0637 |
| | | | | 710/14 |
| 9,135,463 | B2 * | 9/2015 | Yasaki ................... | G06F 21/554 |
| 9,384,112 | B2 * | 7/2016 | Petersen ................ | G06F 11/327 |
| 9,948,751 | B2 * | 4/2018 | Tsuchida ................. | H04L 67/42 |
| 10,338,840 | B1 * | 7/2019 | Brown ................... | G06F 1/1679 |
| 2008/0071938 | A1 * | 3/2008 | Takaoka ............. | H04N 1/00344 |
| | | | | 710/13 |
| 2008/0140928 | A1 * | 6/2008 | Lu ........................... | G06F 3/061 |
| | | | | 711/112 |
| 2008/0195750 | A1 * | 8/2008 | Sadovsky ............... | H04L 67/22 |
| | | | | 709/234 |
| 2009/0100503 | A1 * | 4/2009 | Doyle ..................... | H04L 63/08 |
| | | | | 726/3 |
| 2010/0115177 | A1 * | 5/2010 | Bryant-Rich ......... | G06F 3/0607 |
| | | | | 711/103 |
| 2011/0022777 | A1 * | 1/2011 | Moshayedi ........... | G06F 3/0659 |
| | | | | 711/103 |
| 2011/0072185 | A1 * | 3/2011 | Pinto ..................... | G06F 3/0607 |
| | | | | 710/315 |

(Continued)

FOREIGN PATENT DOCUMENTS

| JP | 2010-146500 A | 7/2010 |
| JP | 2012-053572 A | 3/2012 |
| JP | 2012-069159 A | 4/2012 |

*Primary Examiner* — Mohamed M Gebril
(74) *Attorney, Agent, or Firm* — Kim & Stewart LLP

(57) ABSTRACT

A storage device includes a first memory, a controller circuit configured to control an access to the first memory, a connector connectable to host apparatuses, and a connection detection circuit configured to detect disconnection of the connector from a host apparatus based on a state of a signal line of the connector.

20 Claims, 10 Drawing Sheets

(56) References Cited

U.S. PATENT DOCUMENTS

| | | | |
|---|---|---|---|
| 2012/0054434 A1* | 3/2012 | Kawamura | G06F 12/0866 |
| | | | 711/115 |
| 2012/0284507 A1* | 11/2012 | Bostanci | H04L 9/3213 |
| | | | 713/155 |
| 2014/0380310 A1* | 12/2014 | Wei | G06F 9/45558 |
| | | | 718/1 |
| 2015/0347310 A1* | 12/2015 | Ish | G06F 12/0871 |
| | | | 711/3 |
| 2016/0070474 A1* | 3/2016 | Yu | G06F 3/064 |
| | | | 711/103 |
| 2017/0323121 A1* | 11/2017 | Liu | G06F 21/57 |
| 2018/0210851 A1* | 7/2018 | Hu | G06F 13/4022 |
| 2018/0267788 A1* | 9/2018 | Borlick | G06F 11/0793 |
| 2020/0244458 A1* | 7/2020 | Kanbe | H04L 9/0869 |
| 2020/0285417 A1* | 9/2020 | Onodera | G06F 3/0679 |

* cited by examiner

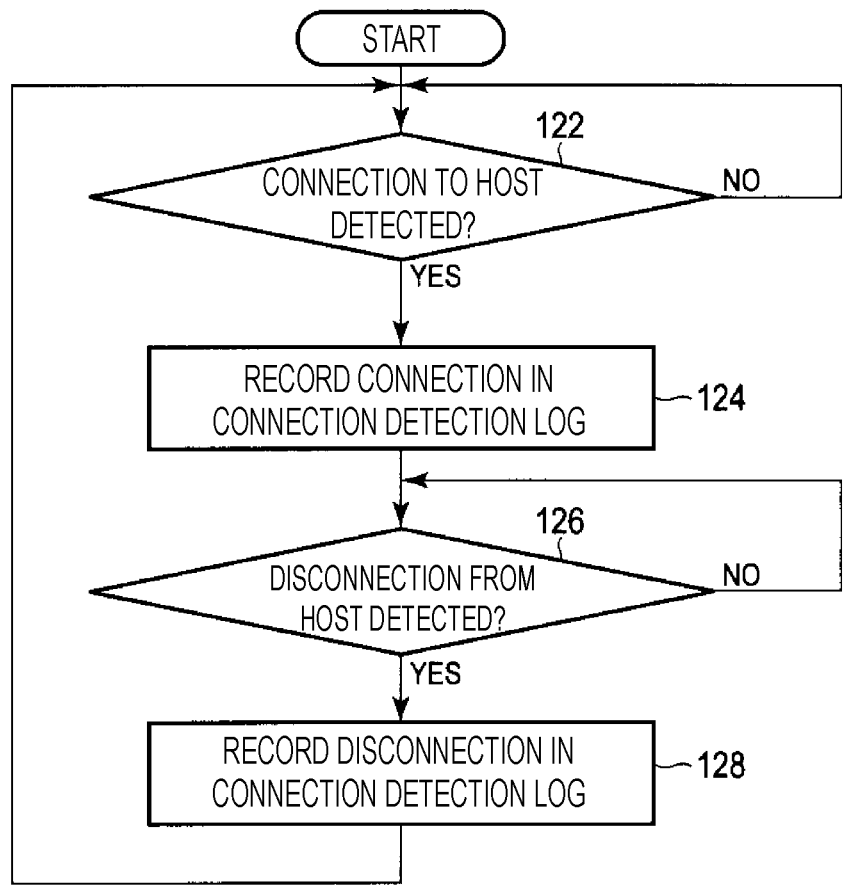

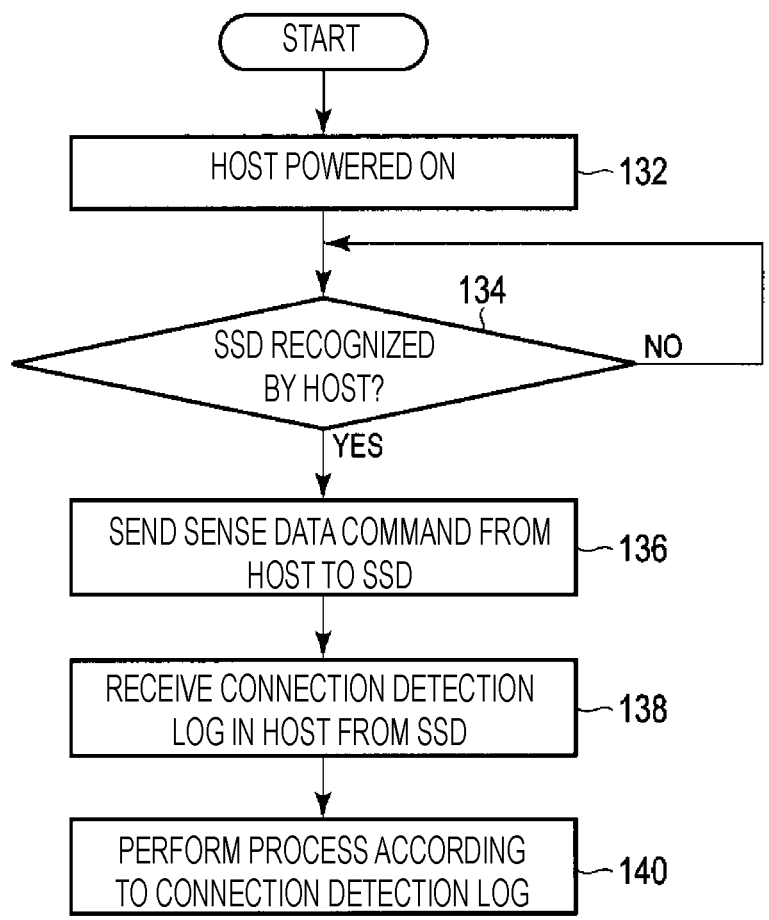

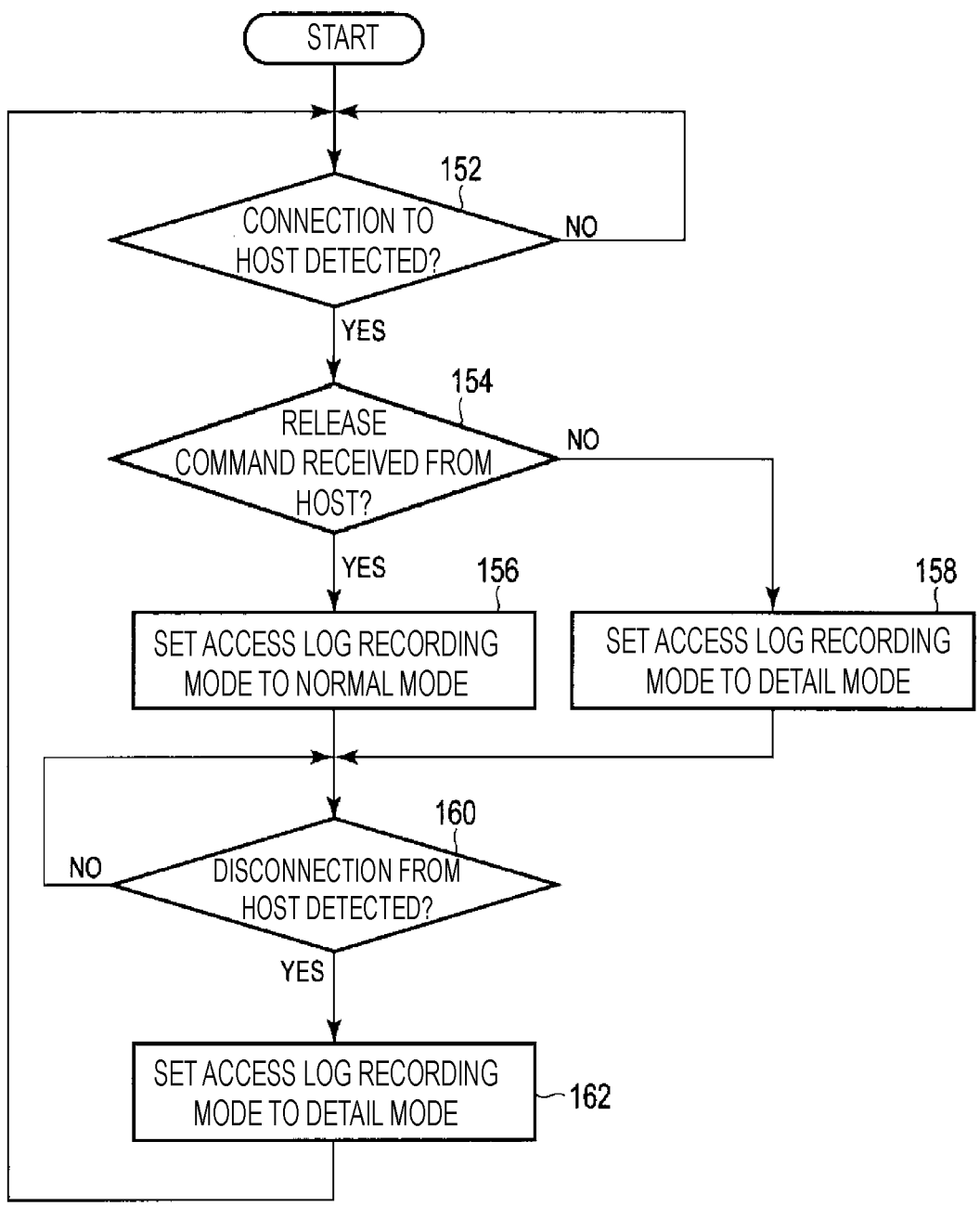

NORMAL LOG
- NUMBER OF TIMES OF POWER ON/OFF
- TEMPERATURE

DETAIL LOG
- DISCONNECTION (TIME)
- CONNECTION (TIME)
- READ COMMAND (TIME, ADDRESS, DATA)
- WRITE COMMAND (TIME, ADDRESS, DATA)
- WRITE COMMAND (TIME, ADDRESS, DATA)
   ⋮
- DISCONNECTION (TIME)
   ⋮

FIG. 11A

FIRST MANAGEMENT TABLE

| LOGICAL ADDRESS | PHYSICAL ADDRESS | DATA |
|---|---|---|
| 100 | *** | AAA |
| 200 | *** | BBB |
| 300 | *** | CCC |
| ⋮ | ⋮ | ⋮ |

FIG. 11B

SECOND MANAGEMENT TABLE

| LOGICAL ADDRESS | PHYSICAL ADDRESS | DATA |
|---|---|---|
| 100 | *** | HHH |
| 200 | *** | BBB |
| 300 | *** | GGG |
| ⋮ | ⋮ | ⋮ |

FIG. 13

| Byte/Bit | Bit7 | Bit6 | Bit5 | Bit4 | Bit3 | Bit2 | Bit1 | Bit0 |
|---|---|---|---|---|---|---|---|---|
| 0 | SP | SPF(0b) | \multicolumn{6}{l}{Page Code(36h)} | | | | | |
| 1 | \multicolumn{8}{l}{Page Length(0Eh)} | | | | | | | |
| 2 | \multicolumn{2}{l}{Pull_Out_Protect_En} | \multicolumn{6}{l}{Data_Protection_Conf.} | | | | | |
| 3 | \multicolumn{8}{l}{reserved} | | | | | | | |
| 15 | | | | | | | | |

STORAGE DEVICE AND METHOD OF CONTROLLING STORAGE DEVICE

CROSS-REFERENCE TO RELATED APPLICATION(S)

This application is based upon and claims the benefit of priority from Japanese Patent Application No. 2019-041739, filed Mar. 7, 2019, the entire contents of which are incorporated herein by reference.

FIELD

Embodiments described herein relate generally to a storage device such as an HDD (Hard Disk Drive), an SSD (Solid State Drive), or the like, and a method of controlling the storage device.

BACKGROUND

As capacity of storage devices has increased, importance of protecting data stored in the storage devices has increased. An example of data protection is to protect stored data when a storage device is disconnected from an electronic apparatus, such as a personal computer. The storage devices of the related art do not detect disconnections from personal computers. A storage device and/or personal computer which detects storage device disconnections and performs data protection operations would be desirable.

DESCRIPTION OF THE DRAWINGS

FIG. 4 is a flowchart illustrating an example of a log recording operation of a storage device according to a second embodiment.

FIG. 5 illustrates an example of a connection detection log according to a second embodiment.

FIG. 6 is a flowchart illustrating an example of a log notification operation of a storage device according to a second embodiment.

FIG. 7 is a flowchart illustrating an example of a log recording operation of a storage device according to a third embodiment.

FIGS. 11A and 11B illustrate examples of a management table according to a fourth embodiment.

FIG. 13 illustrates an example of an operation mode designation command of a storage device according to a sixth embodiment.

DETAILED DESCRIPTION

Figure 1:
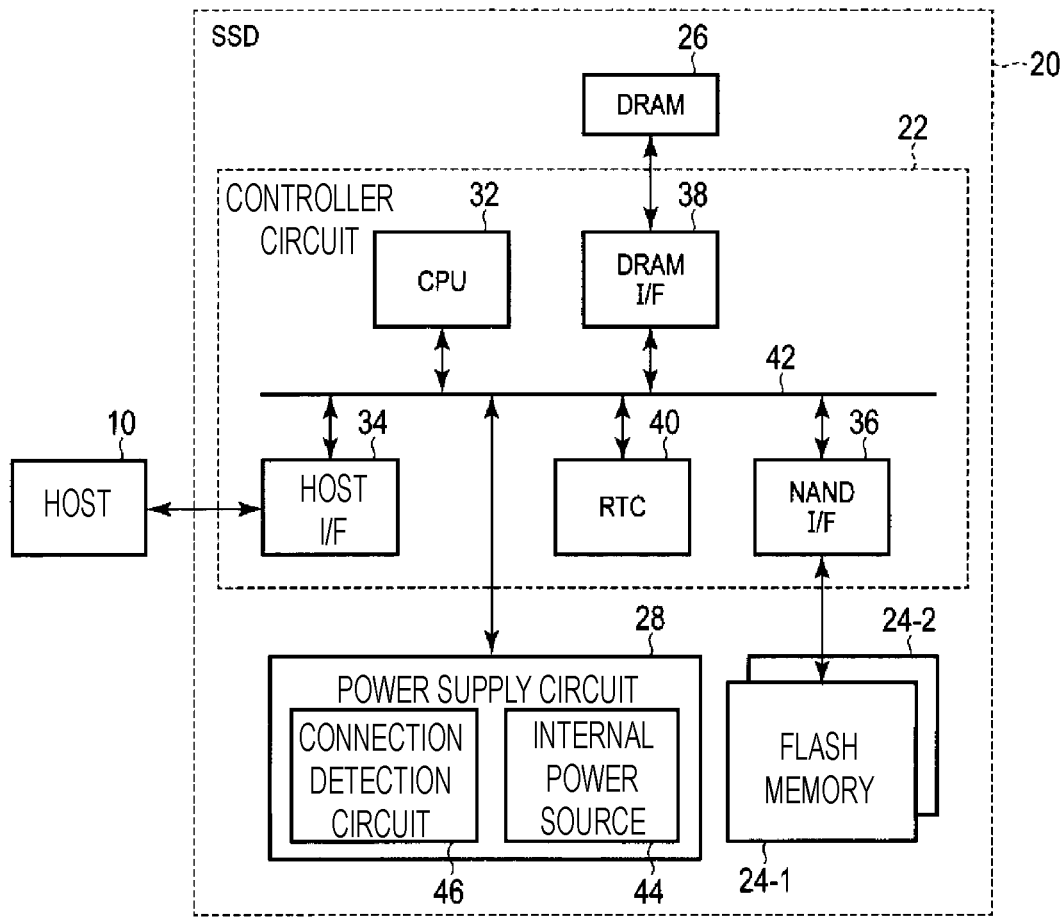
FIG. 1 illustrates an example of a system including a storage device according to a first embodiment.

Embodiments provide a storage device capable of detecting removals or disconnections from an electronic apparatus, and a method of controlling such a storage device.

In general, according to an embodiment, a storage device comprises a first memory, a controller circuit configured to control an access to the first memory, a connector connectable to host apparatuses, and a connection detection circuit configured to detect disconnection of the connector from a host apparatus based on a state of a signal line of the connector.

Hereinafter, example embodiments will be described with reference to the accompanying drawings. The following description explains a device and a method of embodying certain technical ideas of the present disclosure, and these technical ideas are not limited to particular structures, shapes, arrangements, materials and so on of the example components described below. Modifications readily conceivable by those skilled in the art also fall within the scope of the present disclosure. To clarify descriptions, the size, thickness, dimension, shape, etc. of each component may be schematically represented and differ from actual implementations of embodiments. Figures may include components having different dimensional relationships and proportions. Throughout the drawings, corresponding components may be denoted by the same reference numerals and explanation thereof may not be repeated. Certain components may be given different names, and components may have other names differing from those presented. Moreover, a component given a particular name does not mean that the component should not be given another name. In the following description, the term "connection" is meant to include not only a direct connection but also a connection via other components.

First Embodiment

FIG. 1 is a block diagram illustrating an example of the configuration of an information processing system including a storage device according to a first embodiment. The information processing system includes a host 10 and a storage device 20. The storage device 20 is a large-capacity nonvolatile storage device such as an HDD or an SSD, and may be used as a main storage of the information processing system. In the first embodiment, the storage device 20 is assumed to be an SSD. Hereinafter, the storage device 20 is referred to as an SSD 20. The SSD 20 includes a non-volatile semiconductor memory, for example, a NAND-type flash memory, and data are written in the flash memory and read from the flash memory. In the first embodiment, a NAND-type flash memory is used as the nonvolatile semiconductor memory. Alternatively, another nonvolatile semiconductor memory such as a NOR-type flash memory may also be used.

Although the host 10 may be a personal computer or a server, it is assumed here that the host 10 is a personal computer. The SSD 20 may be of a built-in type or an external type, but in the first embodiment, the SSD 20 is assumed to be of a built-in type. The SSD 20 is incorporated in the housing of the host 10.

An interface that electrically interconnects the host 10 and the SSD 20 may be, for example, Serial Advanced Technology Attachment (SATA®), PCI Express® (also referred to as PCIe®), Serial Attached SCSI (SAS®) or the like. The SATA standard includes types of U.2, M.2, mSATA and so on with respect to the shape of a board. The PCIe standard includes types of AIC, M.2, U.2 and so on with respect to the shape of a board. The SAS standard includes types of U.2 and so on with respect to the shape of a board. In the present embodiment, the interface is not particularly limited, and any interface may be used. The SSD 20 is driven by power supplied from the host 10.

The SSD 20 includes flash memories 24-1 and 24-2, which may be collectively referred to as a flash memory 24, and a controller circuit 22. The controller circuit 22 controls read and write of the flash memory 24. The flash memory 24 is formed as a memory chip. Here, two flash memories 24-1 and 24-2 are provided as an example, while the number of flash memories is not limited to two and may be more. The flash memory 24 is configured to store one or more bits of data per memory cell. The flash memory 24 also stores a connection detection log, an access log, and a management table, which will be described below.

The controller circuit 22 is an electronic circuit component including a CPU 32, a host I/F circuit 34, a NAND I/F circuit 36, a DRAM I/F circuit 38 and a real time clock (RTC) 40 which are interconnected by a bus line 42. The controller circuit 22 may be implemented by hardware such as a system-on-a-chip (SoC). The SSD 20 may be provided with a random access memory which is volatile memory, for example, a DRAM 26, outside the controller circuit 22. Alternatively, instead of the DRAM 26, a random access memory capable of faster access, for example, an SRAM, may be incorporated in the controller circuit 22. In the first embodiment, the RTC 40 is not an essential component and may be excluded.

The DRAM 26 (or SRAM) may be provided with a write buffer, which is a buffer area in which data to be written in the flash memory 24 is temporarily stored, a read buffer, which is a buffer area in which data read from the flash memory 24 is temporarily stored, a cache area of a lookup table (LUT) that functions as an address conversion table (also referred to as a logical address/physical address conversion table), and a storage area in which various values used during processing of the SSD 20 and a variety of system management information are stored. The LUT manages the mapping between a logical address designated by the host 10 and a physical address of the flash memory 24. The LUT is read from the DRAM 26 (or SRAM) and written in the flash memory 24 before the system shuts down. When the system starts up, the LUT is read from the flash memory 24 and written in the DRAM 26 (or SRAM).

The SSD 20 also includes a power supply circuit 28. The power supply circuit 28 generates plural power supply voltages necessary for the SSD 20 from a single power supply voltage supplied from the host 10. The power supply circuit 28 may be integrated into an IC. Even when power is not supplied from the host 10, an internal power source 44 that implements a part of the functions of the storage device 20 is incorporated in the power supply circuit 28. The internal power source 44 is composed of a battery or a capacitor charged by the power supply circuit 28. An example of the battery is a lithium ion battery, and an example of the capacitor is a large-capacity electric double layer capacitor called a super capacitor, an aluminum electrolytic capacitor or a ceramic capacitor. The power supply circuit 28 further incorporates a connection detection circuit 46 that detects a connection state between the SSD 20 and the host 10. As will be described below with reference to FIGS. 3A and 3B, the connection detection circuit 46 is driven by the power of the internal power source 44 and detects that the SSD 20 is connected to the host 10 and that the SSD 20 is disconnected from the host 10. The internal power source 44 and the connection detection circuit 46 may not be built in the power supply circuit 28 and may be disposed outside the power supply circuit 28.

Figure 2:
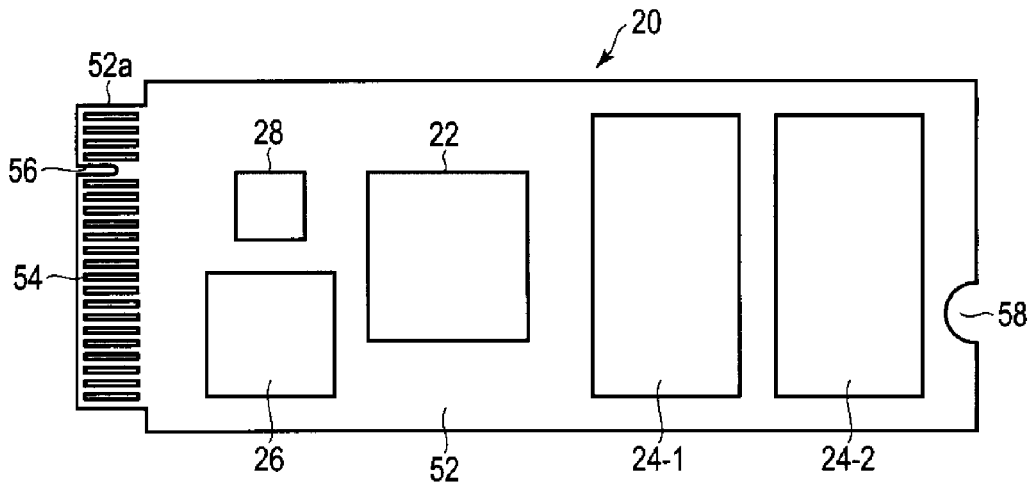
FIG. 2 illustrates an example of a configuration of the storage device according to a first embodiment.

FIG. 2 is a plan view of an example of the appearance of the SSD 20. The SSD 20 is incorporated in the host 10 and fixed to a circuit board (not illustrated) of the host 10. The SSD 20 includes a substantially rectangular mounting board 52. As a recent standard of the mounting board 52, there is a M.2 standard defined for the form factor of a built-in expansion card and a connection terminal of a computer. FIG. 2 illustrates an example of the SSD 20 of the M.2 standard. The mounting board 52 may have a single-layer structure, or may have a multilayer structure formed by overlapping synthetic resins such as epoxy resins. Wiring patterns of various shapes are formed on the surface of each layer. For example, a signal layer that transmits and receives signals, a ground layer, a power supply layer and the like may be formed. A connector unit 54 is provided at a side end 52a of one short side of the mounting board 52. The connector unit 54 is connected to a connector (not illustrated) on the circuit board of the host 10 directly or via a cable. As a result, the SSD 20 is electrically connected to the host 10.

Wiring patterns (not illustrated) formed on the mounting board 52 are electrically connected to predetermined terminal pins of the connector unit 54. A slit 56 is formed at a specific position of the side end 52a, for example, a position shifted from the center of the side end 52a, and is fitted with a protrusion or the like formed on the circuit board of the host 10. This prevents the SSD 20 (more specifically, the mounting board 52) from being connected to the circuit board of the host 10 upside down. Further, a notch 58 is also formed at any appropriate position shifted from the center of the side end opposite to the side end 52a. The orientation of the SSD 20 (more specifically, the mounting board 52) may be recognized also by the position of the notch 58.

It is assumed that an end user uses the host 10 in which the SSD 20 is incorporated in the housing of the host 10. In this case, the end user may disassemble the housing to disconnect the SSD 20 from the host 10. Alternatively, it is assumed that the end user purchases an external SSD 20 and uses the host 10 with the external SSD 20 connected to the host 10. The host 10 owned and managed by the end user is referred to as an "authentic host".

When the SSD 20 is disconnected from the host 10 and then connected to another host different from the host 10, the data stored in the SSD 20 is accessed by the "another host". The "another host" may or may not be an authentic host. Therefore, when the SSD 20 is connected to an unauthentic host, the data stored in the SSD 20 may be illegally accessed.

Since the external SSD 20 may be connected to any host, when the SSD 20 is disconnected from the authentic host and connected to another host other than the authentic host, the SSD 20 may be accessed illegally by the "another host". Since the built-in SSD 20 may also be disconnected from the circuit board when the housing is disassembled, the data stored in the SSD 20 may be illegally accessed by the "another host", as in the external SSD 20. The embodiment includes the connection detection circuit 46 to prevent this unauthorized access.

Figure 3A:
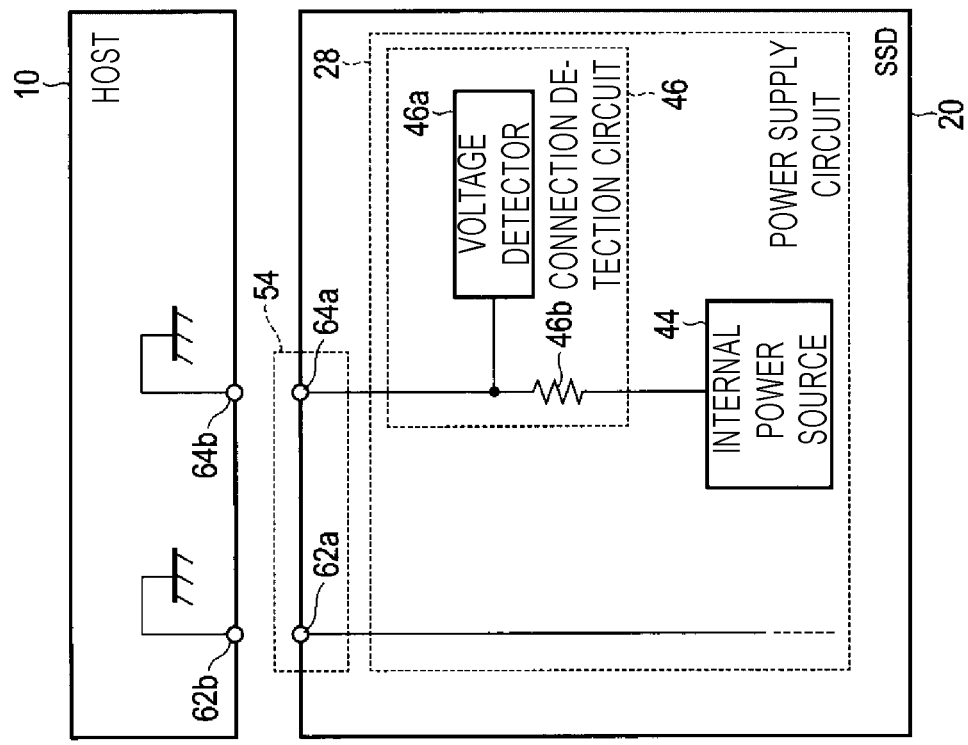
FIGS. 3A and 3B illustrate examples of a connection detector of the storage device according to a first embodiment.
Figure 3B:
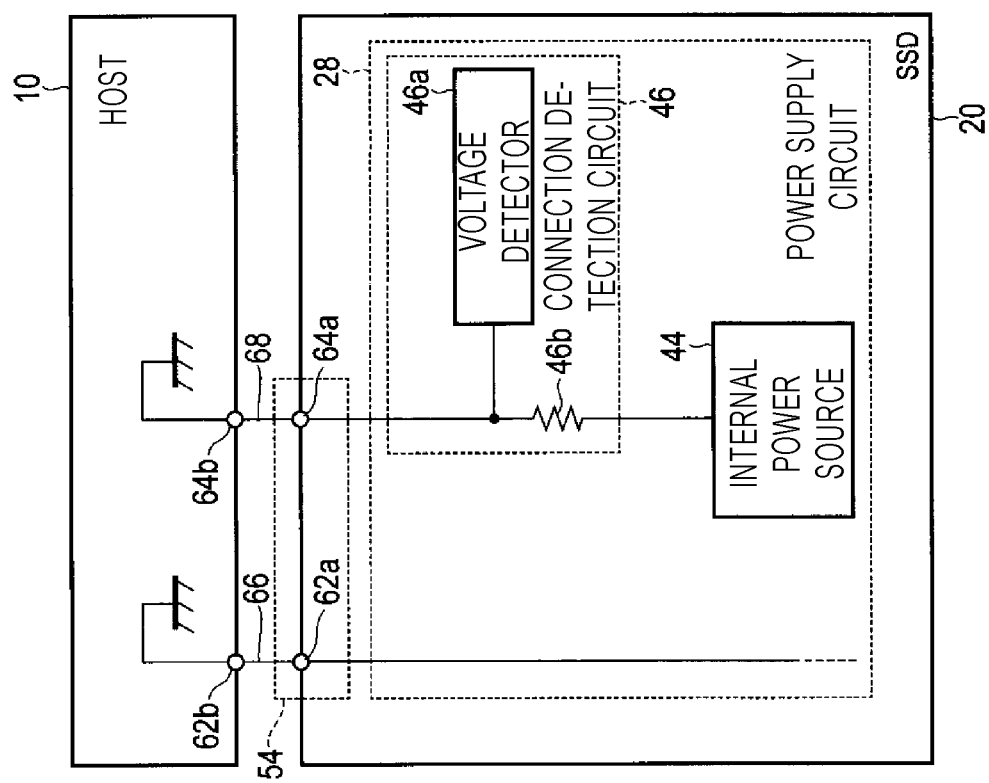

FIGS. 3A and 3B are circuit diagrams of the connection detection circuit 46. The connector unit 54 of the SSD 20 includes plural (e.g., two) first terminal 62a and second terminal 64a, and the first terminal 62a and the second terminal 64a may be connected to the ground of the host 10. The first terminal 62a and the second terminal 64a of the connector unit 54 may be connected to a third terminal 62b and a fourth terminal 64b in the connector of the host 10 via signal lines 66 and 68, respectively. The signal lines 66 and 68 are signal lines that connect the mounting board 52 of the SSD 20 and the circuit board of the host 10. When the mounting board 52 is directly connected to the circuit board without using a cable, the signal lines 66 and 68 are omitted, and the first terminal 62a and the second terminal 64a are directly connected to the third terminal 62b and the fourth terminal 64b, respectively. The connection detection circuit 46 includes a voltage detector 46a and a resistor 46b.

FIG. 3A is a circuit diagram in a state where the SSD 20 (the mounting board 52) is connected to the circuit board of the host 10, and FIG. 3B is a circuit diagram in a state where the SSD 20 (the mounting board 52) is disconnected from the circuit board of the host 10. The third terminal 62b and the fourth terminal 64b in the connector of the host 10 are grounded. The first terminal 62a of the connector unit 54 is connected to the ground terminal in the SSD 20. The second terminal 64a of the connector unit 54 is connected to the internal power source 44 via the resistor 46b. The internal power source 44 outputs a minute current. The voltage detector 46a is also connected to the second terminal 64a. As illustrated in FIG. 3A, when the SSD 20 (the mounting board 52) is connected to the host 10, since the current from the internal power source 44 flows to the ground via the second terminal 64a and the fourth terminal 64b, the voltage of the second terminal 64a detected by the voltage detector 46a has a low level. In the meantime, as illustrated in FIG. 3B, when the SSD 20 (the mounting board 52) is disconnected from the host 10, since a connection between the second terminal 64a on the SSD 20 side and the fourth terminal 64b on the host 10 side is cut off, the current from the internal power source 44 does not flow to the ground, and the voltage of the second terminal 64a detected by the voltage detector 46a changes from the low level to a high level. When the voltage detector 46a detects this voltage change, it is possible to detect the connection of the SSD 20 to the host 10 and the disconnection of the SSD 20 from the host 10.

When the voltage of the second terminal 64a changes from the low level to the high level, the voltage detector 46a detects that the SSD 20 has been disconnected from the host 10. When the voltage of the second terminal 64a changes from the high level to the low level, the voltage detector 46a detects that the SSD 20 has been connected to the host 10. The detection result of the voltage detector 46a is sent to the controller circuit 22 and stored in the DRAM 26 or the flash memory 24. The controller circuit 22 may control the operation of the SSD 20 based on the detection results (the connection detection result and the disconnection detection result) of the voltage detector 46a.

According to the first embodiment, the SSD 20 includes the internal power source 44, the internal power source 44 supplies power to the connection detection circuit 46 to operate to detect the connection state between the SSD 20 and the host 10, and the SSD 20 may detect that the SSD 20 has been disconnected from the host 10 and that the SSD 20 has been connected to the host 10. When it is desired to forma system that performs various data protections in response to detecting that the SSD 20 has been disconnected from the host 10, the data protection system may be formed using the SSD 20 of the embodiment without changing the host 10.

In the first embodiment, the voltage detector 46a monitors the voltage of the second terminal 64a of the connector unit 54 to detect the connection of the SSD 20 to the host 10 and the disconnection of the SSD 20 from the host 10. However, the voltage of the other terminal may be used to detect the connection and the disconnection.

Hereinafter, a method of enhancing the robustness of data protection based on the detected connection and disconnection by the SSD 20 according to the first embodiment will be described. The hardware configuration of the SSD 20 is the same as that of the first embodiment, and therefore, explanation thereof will not be repeated.

Second Embodiment

A second embodiment will be described in which the SSD 20 transmits, to the host 10, a history of detection results for connections to the host 10 and disconnections from the host 10 (also referred to as a connection detection log). When notified of the connection detection log of connections and disconnections, the host 10 may perform a control according to the connection detection log so as to enhance the robustness of data protection. The SSD 20 records the connection detection log in order to notify the host 10 of the connection detection log.

FIG. 4 is a flowchart illustrating an example of the recording operation of the connection detection log of a storage device according to the second embodiment.

As indicated in block 122, the controller circuit 22 determines whether or not the connection detection circuit 46 has detected connection of the SSD 20 to the host 10. When the connection detection circuit 46 does not detect the connection ("NO" in block 122), the controller circuit 22 repeats the determination in block 122. When the connection detection circuit 46 detects the connection ("YES" in block 122), the controller circuit 22 records "connection" in the connection detection log, as indicated in block 124.

As illustrated in FIG. 5, an example of the connection detection log is a table in the flash memory 24 which records information on detection time and a detection result of connection or disconnection for each detection. The detection time may be a hardware clock clocked by the RTC 40 or may be a system clock which is an elapsed time from system startup.

In a state where the SSD 20 is connected to the host 10, the controller circuit 22 determines whether or not the connection detection circuit 46 has detected disconnection of the SSD 20 from the host 10, as indicated in block 126. When the connection detection circuit 46 does not detect the disconnection ("NO" in block 126), the controller circuit 22 repeats the determination in block 126. When the connection detection circuit 46 detects the disconnection ("YES" in block 126), the controller circuit 22 records "disconnection" in the connection detection log, as indicated in block 128. Thereafter, the process flow returns to block 122 where the controller circuit 22 determines whether or not the connection detection circuit 46 has detected connection of the SSD 20 to the host 10. As described above, the SSD 20 may store detection results of connection to the host 10 and disconnection from the host 10.

FIG. 6 is a flowchart of the host 10 illustrating an example of the notification operation of the connection detection log. In a state where the SSD 20 is connected to the host 10, it is assumed that the host 10 is powered on as indicated in block 132. When the host 10 is powered on, the host 10 performs a booting process, and as indicated in block 134, determines whether or not the host 10 has recognized the SSD 20. When it is determined that the host 10 has not recognized the SSD 20 ("NO" in block 134), the determination in block 134 is repeated. When it is determined that the host 10 has recognized the SSD 20 ("YES" in block 134), the host 10 sends a command of requesting notification of a connection detection log to the SSD 20, as indicated in block 136.

An example of the command of requesting notification of a connection detection log is a sense data command of the SAS standard. The sense data command allows the host 10 to specify data that is desired to be received by the host 10 from the SSD 20 (here, a connection detection log). When the sense data command is received, the SSD 20 transmits a connection detection log, which is data specified by the command, to the host 10.

As indicated in block 138, the host 10 receives the connection detection log transmitted from the SSD 20 in response to the sense data command. The host 10 performs a process according to the connection detection log, as indicated in block 140. An example of the process according to the connection detection log includes displaying on the screen that the SSD 20 has been disconnected once and switching an operation mode of the SSD 20. The operation modes include a normal mode in which normal read and write are performed and a protection mode in which read and write are limited for data protection.

According to the second embodiment, the user of the host 10 may be informed that there is a possibility that the SSD 20 has been illegally accessed, thereby allowing the user to take appropriate measures as needed. The timing at which the host 10 transmits the sense data command is not limited to the recognition timing of the SSD 20 in block 134 of FIG. 6 and may be a timing of system startup. Instead of the sense data command, S.M.A.R.T (Self-Monitoring, Analysis and Reporting Technology), which is the self-diagnostic function of the HDD, may be used to receive the connection detection log from the SSD 20.

Third Embodiment

Figures 8, 9A, 9B:
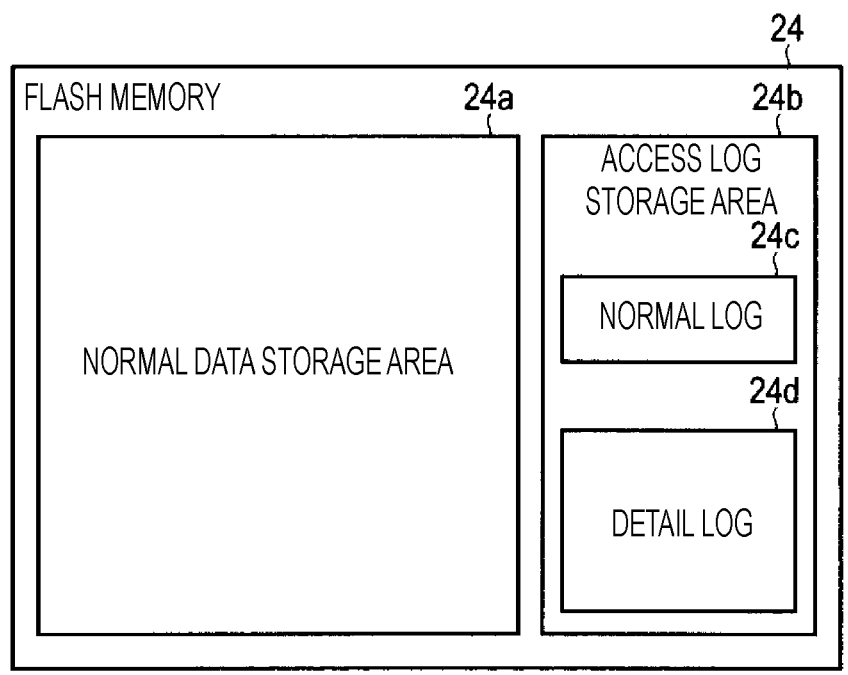
FIG. 8 illustrates an example of a log storage area of a storage device according to a third embodiment.
FIGS. 9A and 9B illustrate examples of logs of a storage device according to a third embodiment.

A third embodiment will be described in which an access log for the SSD 20 is recorded. The access log is a log having a broader concept than the connection detection log according to the second embodiment, but includes, or otherwise incorporates, the information of the connection detection log as well. FIG. 7 is a flowchart illustrating an example of the access log recording operation. FIG. 8 illustrates an example of an access log storage area of the flash memory 24.

As indicated in block 152, the controller circuit 22 determines whether or not the connection detection circuit 46 has detected connection of the SSD 20 to the host 10. When it is determined that the connection detection circuit 46 has not detected the connection ("NO" in block 152), the controller circuit 22 repeats the determination in block 152. When it is determined that the connection detection circuit 46 has detected the connection ("YES" in block 152), the controller circuit 22 determines whether or not a release command has been received from the host 10 within a predetermined period of time, as indicated in block 154. When the SSD 20 is connected to an authentic host 10, the authentic host 10 is configured to issue a release command within a predetermined fixed period of time. That is, the release command is not issued from an unauthentic host 10. Therefore, the SSD 20 may determine whether or not the host 10 is an authentic host based on whether or not the release command has been received.

The release command is a command used to set an access log recording mode to the normal mode. The release command may include a set-feature command of the NVMe standard or a Mode Select command of the SAS standard.

When the release command is received within a predetermined period of time from the detection of connection ("YES" in block 154), the controller circuit 22 sets the access log recording mode to the normal mode, as indicated in block 156. When the access log recording mode is set to the normal mode, the controller circuit 22 records the normal log in a normal log storage area 24c (see, e.g., FIG. 8).

When the release command is not received within a predetermined period of time from the detection of connection ("NO" in block 154), the controller circuit 22 sets the access log recording mode to a detail mode, as indicated in block 158. When the access log recording mode is set to the detail mode, the controller circuit 22 records the detail log in a detail log storage area 24d (FIG. 8).

As illustrated in FIG. 8, the flash memory 24 includes a normal data storage area 24a and an access log storage area 24b, and the access log is stored in the access log storage area 24b. The access log storage area 24b includes the normal log storage area 24c and the detail log storage area 24d. As illustrated in FIG. 9A, the normal log includes information such as the number of times of power on/off, temperature and the like. As illustrated in FIG. 9B, the detail log includes information such as time of connection/disconnection (connection detection log), the type and issuance time of access command issued from the host 10 to the SSD 20 (which may be a hardware clock or a system clock), address and data. The normal log may be always recorded because the data size thereof is small, while the detail log may not always be recorded because the data size thereof increases according to the number of accesses. Therefore, the normal mode and the detail mode are defined as the access log recording mode. When the access log recording mode is the normal mode, the controller circuit 22 records only the normal log in the normal log storage area 24c. When the access log recording mode is the detail mode, the controller circuit 22 records the normal log in the normal log storage area 24c and also records the detail log in the detail log storage area 24d.

As indicated in block 160, the controller circuit 22 determines whether or not the connection detection circuit 46 has detected disconnection of the SSD 20 from the host 10. When it is determined that the connection detection circuit 46 has not detected the disconnection ("NO" in block 160), the controller circuit 22 repeats the determination in block 160. When it is determined that the connection detection circuit 46 has detected the disconnection ("YES" in block 160), the controller circuit 22 sets the access log recording mode to the detail mode, as indicated in block 162. However, in a state where the SSD 20 is disconnected from the host 10, no access log is generated because the SSD 20 does not receive a command. Thereafter, block 152 is executed again, and the controller circuit 22 determines whether or not the connection detection circuit 46 has detected connection of the SSD 20 to the host 10.

In this way, when the connection of the SSD 20 to the authentic host 10 is detected, the access log recording mode is set to the normal mode, as indicated in block 156, and when the disconnection of the SSD 20 from the host 10 is detected, the access log recording mode is changed from the normal mode to the detail mode, as indicated in block 162. Even when the SSD 20 in which the access log recording mode is set to the detail mode is connected to an unauthentic host, the access log recording mode remains in the detail mode and is not changed to the normal mode. The authentic host 10 is authorized to change the access log recording mode from the detail mode to the normal mode. When the release command is not issued from the host 10 when the SSD 20 is connected to the host 10, the access log recording mode is not changed from the detail mode to the normal mode.

In this way, according to the third embodiment, when the SSD 20 is disconnected from the host 10 and connected to an unauthentic host, the detail log is also recorded in addition to the normal log. Thereafter, the SSD 20 is connected to the authentic host 10, and the authentic host 10 may examine the detail log to determine whether or not the data in the SSD 20 has been illegally accessed while the SSD 20 has been disconnected from the host 10 and connected to another host. When the data is illegally rewritten, it may be possible to prevent the host 10 from knowing that the data has been rewritten. However, in the third embodiment, by allowing the SSD 20 to record the access log, the host 10 may grasp which data in the SSD 20 has been rewritten and read.

When such an access log is not recorded, and when an SSD that has been once disconnected from the host 10 and possibly connected to another host different from the host 10 is again connected to the host 10, it is dangerous to use the SSD 20. In that case, a new SSD has to be prepared to restore the entire SSD from a backup file. However, according to the third embodiment, since a part accessed by another host (rewritten part) may be known, when only that part is restored, an SSD possibly connected to the "another host" may be also used. In addition, because the restoration is partial, the restoration time will become shorter. Further, by checking the read command history, it is possible to identify an opened file and infer data that may have been leaked.

As a result, even when the SSD 20 is disconnected from the host 10 and the data in the SSD 20 is read or rewritten, the read information or the rewritten information may be quickly identified based on the access log stored in the SSD 20. This makes it possible to grasp the risk of information leakage and reduce the time of recovery work for repair.

When the SSD 20 is disconnected from the host 10 and connected to the host 10, the detail log is not recorded.

When the notification processing flow of FIG. 6 according to the second embodiment is partially modified, the access log according to the third embodiment may be notified to the host 10, as in the connection detection log according to the second embodiment. For example, in block 136, the host 10 sends a sense data command to the SSD 20 as an access log notification request command. When the sense data command is received, the SSD 20 transmits the normal log and the detail log in the access log storage area 24*b* to the host 10. In block 138, the host 10 receives the normal log and the detail log transmitted from the SSD 20 in response to the sense data command. In block 140, the host 10 performs a process according to the normal log and the detail log.

Fourth Embodiment

When the SSD 20 is disconnected from the authentic host 10 and connected to another host, and the data in the SSD 20 is rewritten by the another host, the data before the rewriting may be searched for based on the access log, and the state of the SSD 20 may be restored to the state before the rewriting. However, in order to search for the data before the rewriting, all access logs need to be traced back chronologically, which is a time-consuming task. In addition, when the SSD 20 is disconnected from the authentic host 10 and connected to another host different from the host 10, and the data of the SSD 20 is read by the "another host", the read data may be searched for based on the access log, but this is also a time-consuming task. Descriptions will be made below on a fourth embodiment in which the state of the SSD 20 may be simply returned to the state before the rewriting when the data has been illegally rewritten.

The fourth embodiment includes a management table that manages data rewrite. The management table represents the relationship between an address and data, and is updated each time the data is rewritten. The fourth embodiment includes two types of management tables (a first management table and a second management table). The second management table is updated every time the data is rewritten, whereas unlike the second management table, the first management table has a period during which the updating is interrupted.

Figure 10:
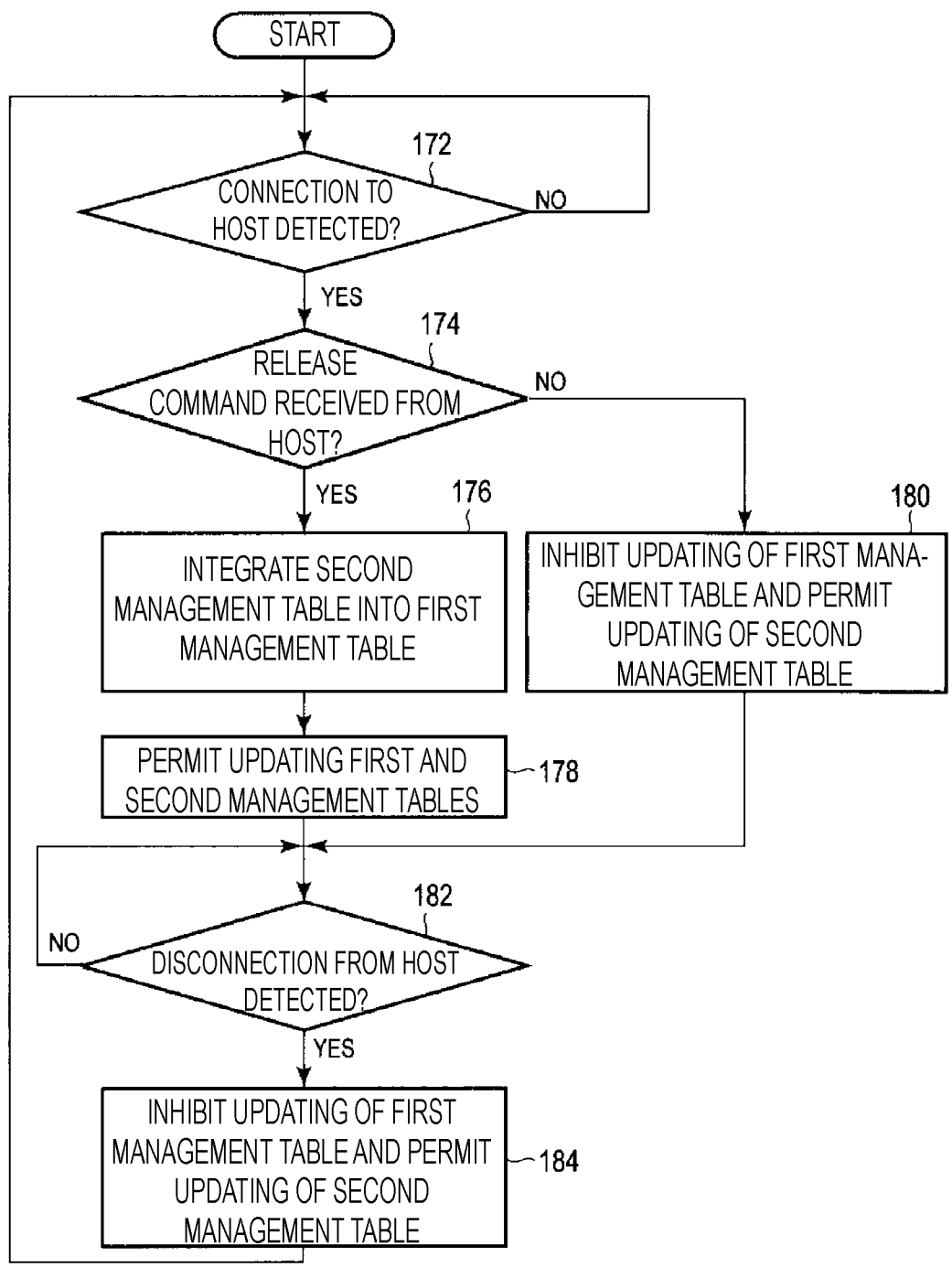
FIG. 10 is a flowchart illustrating an example of an operation of updating a management table of a storage device according to a fourth embodiment.

FIG. 10 is a flowchart illustrating an example of the operation of updating the management table according to the fourth embodiment.

As indicated in block 172, the controller circuit 22 determines whether or not the connection detection circuit 46 has detected connection of the SSD 20 to the host 10. When it is determined that the connection detection circuit 46 has not detected the connection ("NO" in block 172), the controller circuit 22 repeats the determination in block 172. When it is determined that the connection detection circuit 46 has detected the connection ("YES" in block 172), the controller circuit 22 determines whether or not a release command has been received from the host 10 within a predetermined period of time, as indicated in block 174. As described above, since the authentic host 10 is configured to issue the release command within a predetermined period of time when the SSD 20 is connected thereto, the SSD 20 determines whether or not the host 10 is authentic, based on whether or not the SSD 20 has received the release command.

When the release command is received within a predetermined period of time from the detection of connection ("YES" in block 174), the controller circuit 22 integrates the second management table into the first management table by copying the contents of the second management table to the first management table, as indicated in block 176. As will be described below, the second management table is updated no matter what host 10 the SSD 20 is connected to, and on the other hand, when the SSD 20 is connected to an unauthentic host 10, the first management table is not updated and is maintained at the state where the SSD 20 has been disconnected from the authentic host 10. Therefore, when the data is illegally rewritten, the state of the SSD 20 may be simply returned to the state before the rewriting based on the first management table. Therefore, when the SSD 20 is connected to the authentic host 10, the first and second management tables are integrated in block 176 in order to match the contents of the first and second management tables each other.

As indicated in block 178, the controller circuit 22 permits updating of the first and second management tables. That is, when the SSD 20 is connected to the authentic host 10, the first and second management tables are updated each time the data is rewritten.

When the release command is not received within the predetermined period of time from the detection of connection ("NO" in block 174), the controller circuit 22 inhibits the update of the first management table and permits the update of the second management table, as indicated in block 180. That is, when the SSD 20 is connected to an unauthentic host, the second management table is updated every time the data is rewritten by the unauthentic host 10, but the first management table is not updated. The contents of the first management table are maintained at the state where the SSD 20 has been disconnected from the authentic host 10.

FIGS. 11A and 11B illustrate examples of the first management table and the second management table, respectively. As illustrated in FIGS. 11A and 11B, the first and second management tables represent a correspondence among logical addresses, physical addresses, and data. When a write command that specifies a write address (logical address) and write data is supplied from the authentic host 10, the logical address specified by the write command, the corresponding physical address, and the write data written in the SSD 20 are all registered in the first and second management tables. When data is already written by the write command and a new write command for the write address registered in the management table is supplied, the data for the write address in the management table is updated. In this way, in a state where the SSD 20 is connected to the authentic host 10, the first and second management tables have the same contents.

When a write command that specifies a write address (logical address) and write data is supplied from an unauthentic host 10, the logical address specified by the write command, the corresponding physical address, and the write data written in the SSD 20 are registered only in the second management table. For example, when the data of the logical address "100" is rewritten as "HHH", the first management table is not updated, and only the second management table is updated.

As indicated in block 182, the controller circuit 22 determines whether or not the connection detection circuit 46 has detected disconnection of the SSD 20 from the host 10. When it is determined that the connection detection circuit 46 has not detected the disconnection ("NO" in block 182), the controller circuit 22 repeats the determination in block 182.

When it is determined that the connection detection circuit 46 has detected the disconnection ("YES" in block 182), the SSD 20 no longer receives a command from the host. On the other hand, as indicated in block 184, the controller circuit 22 inhibits updating of the first management table and permits updating of the second management table. Thereafter, block 172 is executed again, and the controller circuit 22 determines whether or not the connection detection circuit 46 has detected connection of the SSD 20 to the host 10.

Therefore, even when a host other than the authentic host 10 illegally rewrites data after the SSD 20 is disconnected from the authentic host 10, all access logs need to be traced back chronologically and the SSD 20 may be simply restored to the state before unauthorized rewriting based on the contents of the first management table. This may prevent the SSD 20 from being affected by unauthorized rewriting. In addition, since the rewritten address is known by a host other than the authentic host, an access to data stored in an address rewritten by another host may be inhibited. This may also prevent the system from being affected by the illegally rewritten data.

According to the fourth embodiment, after the SSD 20 is disconnected from the authentic host and connected to another host, the rewritten data is managed by the dedicated second management table, and the data before the SSD 20 is disconnected from the authentic host is managed by the first management table. As a result, it is possible to simply restore data that has been illegally rewritten by a host other than the authentic host to the data before the rewriting and also to inhibit an access to the data that has been illegally rewritten, thereby preventing the host 10 from being affected by the data that has been illegally rewritten.

Further, the management table may manage not only the rewriting of data by a write command but also the reading of data by a read command. That is, when a read command that specifies a read address (logical address) is supplied from the host 10, the management table reads the logical address specified by the read command, the corresponding physical address, and the read data read from the SSD 20 may be registered in the first and second management tables. As a result, since data that has been read illegally is specified, countermeasures against the leaked data may be performed.

Fifth Embodiment

In a fifth embodiment, RTC 40 is specifically utilized as a component, while RTC 40 may be omitted in the first to fourth embodiments. That is, the SSD 20 according to the fifth embodiment manages the connection and disconnection times of the SSD 20 using a real time clock provided by the RTC 40. The fifth embodiment is different from the second embodiment in that the time of the connection detection log illustrated in FIG. 5 is not as according to the system clock but rather the real time clock. The other aspects are the same as the second embodiment.

When the SSD 20 is mounted on the RTC 40 and records the time when the SSD 20 has been connected to the host 10 and the time when the SSD 20 has been disconnected from the host 10, the host 10 may determine whether the maintenance of the SSD has been performed as planned or illegal connection/disconnection has been performed. Further, when the illegal connection/disconnection is performed, it may be possible to specify a person who has performed the connection/disconnection.

Sixth Embodiment

A sixth embodiment will be described in which the SSD 20 sets the operation mode to the normal mode or the data protection mode when the connection detection circuit 46 detects connection to the host 10 and disconnection from the host 10.

Figure 12:
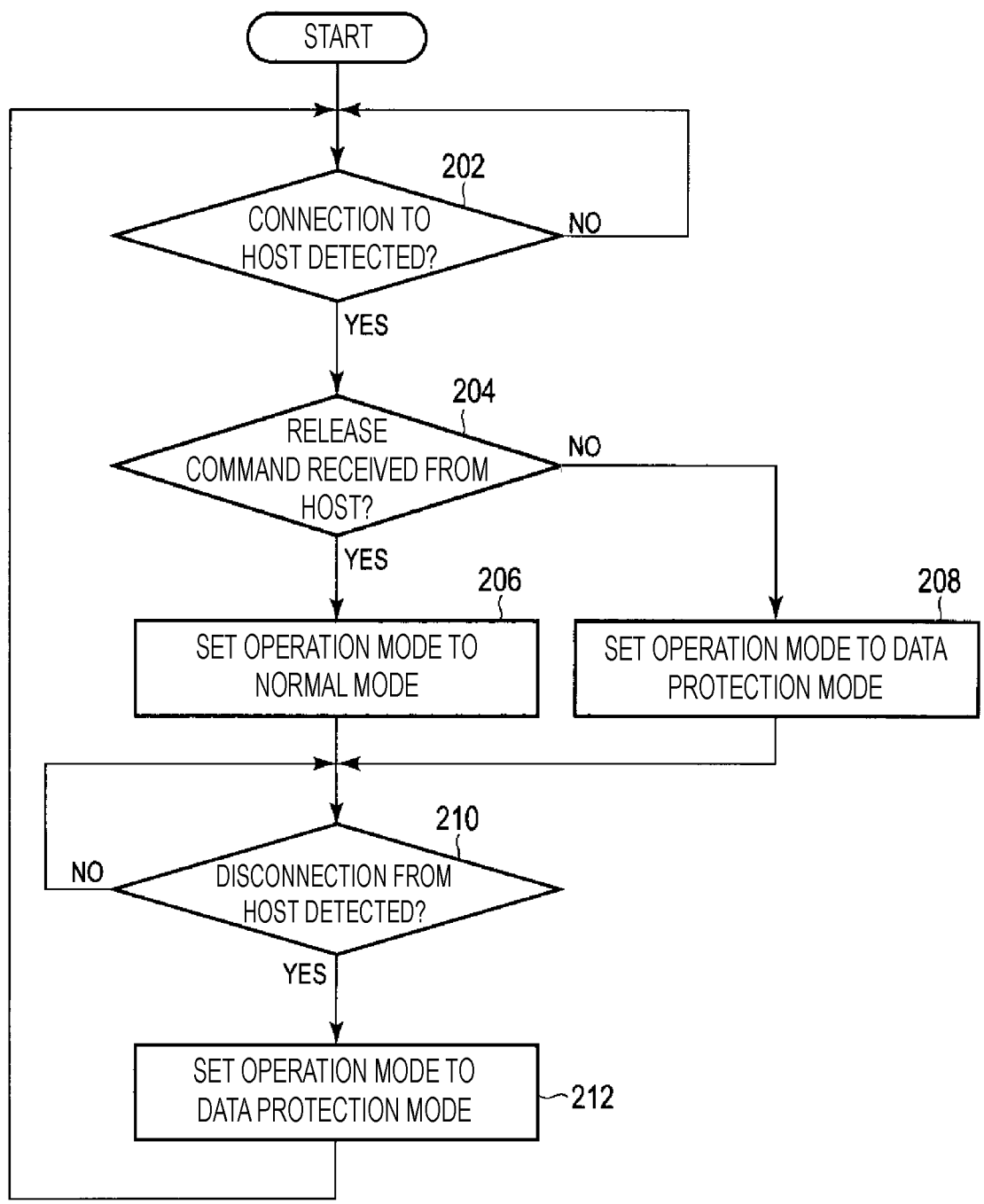
FIG. 12 is a flowchart illustrating an example of a method of controlling a storage device according to a sixth embodiment.

FIG. 12 is a flowchart illustrating an example of an operation mode setting process of a storage device according to the sixth embodiment. As indicated in block 202, the controller circuit 22 determines whether or not the connection detection circuit 46 has detected connection of the SSD 20 to the host 10. When it is determined that the connection detection circuit 46 has not detected the connection ("NO" in block 202), the controller circuit 22 repeats the determination in block 202. When it is determined that the connection detection circuit 46 has detected the connection ("YES" in block 202), the controller circuit 22 determines whether or not a release command has been received from the host 10 within a predetermined period of time, as indicated in block 204.

When the release command is received within a predetermined period of time from the detection of connection ("YES" in block 204), the controller circuit 22 sets the operation mode of the SSD 20 to the normal mode, as indicated in block 206. When the operation mode of the SSD 20 is the normal mode, the controller circuit 22 executes all commands from the host 10.

When the release command is not received within a predetermined period of time from the detection of connection ("NO" in block 204), the controller circuit 22 sets the operation mode of the SSD 20 to the data protection mode, as indicated in block 208. When the operation mode of the SSD 20 is the data protection mode, the controller circuit 22 performs a data protection operation such as inhibiting execution of a part of the command from the host 10. Examples of the data protection operation may include an action to make the data inaccessible on the SSD 20 side, an action to erase the data, and the like. Further, the examples of the data protection operation may include measures depending on the usage of the host 10, such as an action to register in the SSD 20 a measure against the risk of the data stored in the SSD 20 and inhibit an access to the entire SSD 20, an action to delete only information including personal information, and the like.

As indicated in block 210, the controller circuit 22 determines whether or not the connection detection circuit 46 has detected disconnection of the SSD 20 from the host 10. When it is determined that the connection detection circuit 46 has not detected the disconnection ("NO" in block 210), the controller circuit 22 repeats the determination in block 210.

When it is determined that the connection detection circuit 46 has detected the disconnection ("YES" in block 210), the SSD 20 no longer executes a command from the host. On the other hand, as indicated in block 212, the controller circuit 22 sets the operation mode of the SSD 20 to the data protection mode. Thereafter, the block 202 is executed again, and the controller circuit 22 determines whether or not the connection detection circuit 46 has detected connection of the SSD 20 to the host 10.

In this way, when the SSD 20 is disconnected from any host 10, the operation mode is set to the data protection mode. Even when the SSD 20 whose operation mode is set to the data protection mode is connected to an unauthentic host, the operation mode remains at the data protection mode and is not changed to the normal mode. A right to change the operation mode from the data protection mode to the normal mode is given to the authentic host 10. When the SSD 20 whose operation mode is set to the data protection mode is connected to the authentic host 10 and receives a release command from the authentic host 10, the operation mode is changed from the data protection mode to the normal mode.

Thus, the release command is a command used to return the operation mode from the data protection mode to the normal mode. After the SSD 20 is temporarily disconnected from the authentic host, the SSD 20 may be reconnected to the authentic host, in which case there is no need to maintain the operating mode at the data protection mode, and as indicated in block 206, the operation mode is set to the normal mode.

In the above description, while plural data protection operations are defined and the operation to be actually executed among the operations is determined in advance on the SSD 20 side, the host 10 may designate any data protection operation. For example, as indicated in blocks 134 and 136 of FIG. 6 according to the second embodiment, when the host 10 recognizes the SSD 20, the host 10 may transmit a command of designating a data protection operation to the SSD 20. As the command of designating a data protection operation, a set-feature command of the NVMe standard or a Mode Select command of the SAS standard may be used. The designated data protection operation is set in the SSD 20.

An example of the command of designating a data protection operation is illustrated in FIG. 13. FIG. 13 illustrates an example of a vendor command that may be defined by a vendor.

This command is composed of 15 bytes, in which bit 7 of byte 0 is SP, bit 6 is SPF (0b), and 6 bits of bit 5 to bit 0 are page code (36 h). Byte 1 is the Page Length (0Eh). Bit 7 of byte 2 is data Pull_Out_Protect_En, and 7 bits of bit 6 to bit 0 of byte 2 are Data_Protection_Conf.

Pull_Out_Protect_En is used to set connection/disconnection detection and data protection by the connection detection circuit 46 as follows.

0b: Protection invalid
1b: Protection valid

The SSD 20 includes the connection detection circuit 46. When Pull_Out_Protect_En is 0b, the controller circuit 22 does not operate according to the connection/disconnection detection result by the connection detection circuit 46, and the SSD 20 is regarded as not having the connection detection circuit 46. When Pull_Out_Protect_En is 1b, the controller circuit 22 performs an operation according to the connection/disconnection detection result by the connection detection circuit 46.

Data_Protection_Conf indicates the behavior change and mode switching of data protection when disconnection is detected. The behavior change of the data protection at the time of detection of disconnection is set as follows.

01h: Delete all data
02h: Refuse all data read/write
03h: Permit only reading of all data
04h: Permit read/write (no data protection)
05h: Switch partition
06h: Output false information
07h: Save command history (detail log)
08h: Switch to second management table When Data_Protection_Conf is 01h and when the SSD 20 is disconnected from the host 10, since all data is deleted, the data of the SSD 20 is completely protected.

When Data_Protection_Conf is 02h and when the SSD 20 is disconnected from the host 10, since reading/writing for all the data of the SSD 20 is refused, the data of the SSD 20 is inhibited from being illegally leaked and rewritten.

When Data_Protection_Conf is 03h, the data of the SSD 20 is inhibited from being illegally rewritten.

For data protection, the data storage area of the SSD 20 may be divided into a first partition and a second partition. An address specified by a command is an address of the first partition, and an address of the second partition is specified by an authentic host, but is not specified by a command from a host other than the authentic host. Usually, data is stored in the first partition. When the SSD 20 is disconnected from the host 10, data is stored in the second partition unlike a command designation. The data stored in the second partition is protected from an access by a host other than the authentic host. When Data_Protection_Conf is 05h, the data storage area is switched from the first partition to the second partition.

For data protection, when the SSD 20 receives a read command, the SSD 20 may also return to the host 10 false information that is not the data specified by the read command. Therefore, the data area of the SSD 20 may be divided into a normal data area and a false information area. When Data_Protection_Conf is 06h and when the read command is received, the SSD 20 may also return false information to the host 10. The false information may not be stored in advance in a dedicated area, and may be generated and sent back to the host 10 when the read command is received.

When Data_Protection_Conf is 07h and when disconnection of the SSD 20 from the host 10 is detected, the detail log is also recorded in addition to the normal log, as in the third embodiment.

When Data_Protection_Conf is 08h, in addition to the first management table, the second management table is generated. In this case, when disconnection of the SSD 20 from the host 10 is detected, updating of the first management table is inhibited, as in the fourth embodiment.

The mode switching upon detection of disconnection is set as follows.

09h: Switch to first partition
0Ah: Switch to second partition
0Bh: Integrate management tables
0Ch: Switch to first management table
0Dh: Switch to second management table When Data_Protection_Conf is 09h, the data storage area is regarded as the first storage area, and data protection is not performed.

When Data_Protection_Conf is 0Ah, as in Data_Protection_Conf of 05h, the data storage area is switched from the first storage area to the second storage area, and the data in the second storage area is prevented from being read from a host other than an authentic host.

When Data_Protection_Conf is 0Bh, as indicated in block 176 according to the fourth embodiment, the contents of the second management table are integrated into the first management table (that is, the contents of the first management table are changed to the contents of the second management table indicating the latest state).

When Data_Protection_Conf is 0Ch, the contents of the first management table are referred to. That is, the data changed after the disconnection is not referred to, and the data before the disconnection is read out.

When Data_Protection_Conf is 0Dh, the first management table and the second management table are generated. When disconnection of the SSD 20 from the host 10 is detected, the updating of the first management table is stopped, as in the fourth embodiment. The switching to the second management table when Data_Protection_Conf is 08h is preset contents that are triggered when the disconnection of the SSD 20 is detected, and a command of Data_Protection_Conf of 08h is only a switching command.

According to the sixth embodiment, when disconnection of the SSD 20 from the host 10 is detected, one or more protection operations selected from various data protection operations may be performed. The protection operation(s) to be executed may be set in advance in the SSD 20 or may be designated from the host 10 when the SSD 20 is connected to the host 10.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A storage device comprising:
a first memory;
a controller circuit configured to control access to the first memory;
a connector connectable to host apparatuses; and
a connection detection circuit configured to:
detect disconnection of the connector from a first host apparatus based on a state of a signal line of the connector;
after detecting disconnection of the connector from the first host apparatus, return, in response to receiving a read command for data stored in the first memory from a second host apparatus connected to the connector, data different from the data stored in the first memory, and not the data stored in the first memory, to the second host apparatus.

2. The storage device according to claim 1, wherein the controller circuit is further configured to record a history of disconnection of the connector from the first host apparatus.

3. The storage device according to claim 2, wherein the history includes a detection timing of the disconnection from the first host apparatus.

4. The storage device according to claim 1, wherein the controller circuit is further configured to delete the data stored in the first memory in accordance with detecting the disconnection of the connector from the first host apparatus.

5. The storage device according to claim 4, further comprising:
a second memory configured to store information indicating whether or not the controller circuit is set to delete the data stored in the first memory in accordance with detecting the disconnection of the connector from the first host apparatus.

6. The storage device according to claim 1, further comprising:
a second memory configured to store information indicating whether or not the controller circuit is set to return the data different from the data stored in the first memory, and not the data stored in the first memory, in response to receiving the read command for the data stored in the first memory.

7. The storage device according to claim 1, further comprising:
a second memory configured to store information indicating whether or not the controller circuit is set to permit an access to the data in the first memory in response to receiving an access request from the second host apparatus connected to the connector after the connection detection circuit detects disconnection of the connector from the first host apparatus.

8. The storage device according to claim 7, wherein the controller circuit is further configured to prohibit access to the data in the first memory when the information indicates that the access request from the second host apparatus is denied.

9. The storage device according to claim 1, wherein the connection detection circuit is further configured to detect connection of the connector to a host apparatus.

10. The storage device according to claim 9, wherein the controller circuit is further configured to record a first history of disconnection of the connector and a second history of connection of the connector.

11. The storage device according to claim 10, wherein the first history includes a detection timing of the disconnection, and the second history includes a detection timing of the connection.

12. The storage device according to claim 10, wherein the controller circuit is further configured to send the first history and the second history to a host apparatus connected to the connector.

13. A storage device comprising:
a non-volatile memory;
a connector connectable to host apparatuses;
a connection detection circuit configured to detect connection of the connector to a host apparatus based on a state of a signal line of the connector; and a controller circuit configured to:
  set an operational mode of the controller circuit to a first mode when the controller circuit receives a first command from the host apparatus within a predetermined time period after the connection detection circuit detects the connection of the connector to the host apparatus, and
  set the operational mode of the controller circuit to a second mode in which the controller circuit performs a data security process more extensive than in the first mode, when the controller circuit does not receive the first command from the host apparatus within the predetermined time period after the connection detection circuit detects the connection of the connector to the host apparatus.

14. The storage device according to claim 13, wherein
the connection detection circuit is further configured to detect disconnection of the connector from the host apparatus based on the state of the signal line of the connector, and
the controller circuit is further configured to set the operational mode of the controller circuit to the second mode using power stored in the storage device upon the disconnection of the connector from the host apparatus being detected.

15. The storage device according to claim 13, wherein the controller circuit is further configured to record a first log during the first mode, and a second log including more access log parameters than the first log during the second mode.

16. The storage device according to claim 13, wherein the controller circuit is further configured to update a first address mapping table and a second address mapping table during the first mode, and update the second address mapping table and prohibit update of the first address mapping table during the second mode.

17. The storage device according to claim 13, wherein the controller circuit is further configured to enable at least one type of access to the non-volatile memory during the first mode, and disable the at least one type of access to the non-volatile memory during the second mode.

18. The storage device according to claim 17, wherein the at least one type of access includes reading of data from the non-volatile memory.

19. A control method of a storage device including a memory, a controller circuit configured to control an access to the memory, and a connector connectable to host apparatuses, the method comprising:
  detecting disconnection of the connector from a first host apparatus based on a state of a signal line of the connector;
  after detecting disconnection of the connector from the first host apparatus, receiving a read command for data stored in the memory from a second host apparatus connected to the connector; and
  returning, in response to the read command, data different from the data stored in the memory, and not the data stored in the memory, to the second host apparatus.

20. The control method according to claim 19, further comprising:
  recording a history of disconnection of the connector from the first host apparatus.

* * * * *